(12) United States Patent
Powrozek et al.

(10) Patent No.: US 6,978,870 B2
(45) Date of Patent: Dec. 27, 2005

(54) SELF ADJUSTING ELECTRICALLY POWERED PARKING BRAKE ACTUATOR MECHANISM WITH MANUAL RELEASE

(75) Inventors: Bryan Daniel Powrozek, Sterling Heights, MI (US); Michael Andrew Slumba, Clarkston, MI (US)

(73) Assignee: Dura Global Technologies, Inc., Rochester Hills, MI (US)

(*) Notice: Subject to any disclaimer, the term of this patent is extended or adjusted under 35 U.S.C. 154(b) by 0 days.

(21) Appl. No.: 10/811,059

(22) Filed: Mar. 26, 2004

(65) Prior Publication Data

US 2005/0000762 A1    Jan. 6, 2005

Related U.S. Application Data

(60) Provisional application No. 60/457,776, filed on Mar. 26, 2003.

(51) Int. Cl.$^7$ ............................................. F16D 65/36
(52) U.S. Cl. ................... 188/156; 188/162; 188/2 D; 188/1.11 R
(58) Field of Search ........................... 188/158, 156, 188/162, 1.11 R, 2 D, 196 BA, 265; 303/20; 74/501.5 R; 192/111 A (56) References Cited

U.S. PATENT DOCUMENTS

| | | | | |
|---|---|---|---|---|
| 4,373,402 A * | 2/1983 | Barrett | .................. | 73/862.391 |
| 4,850,242 A * | 7/1989 | Hass et al. | ...................... | 74/512 |
| 5,180,038 A * | 1/1993 | Arnold et al. | .............. | 188/171 |
| 5,590,744 A * | 1/1997 | Belmond | ...................... | 188/265 |
| 6,193,022 B1 * | 2/2001 | Bode | .......................... | 188/2 D |
| 6,213,259 B1 * | 4/2001 | Hanson et al. | .............. | 188/156 |
| 6,249,737 B1 * | 6/2001 | Zipp | ............................ | 701/70 |
| 6,386,338 B1 * | 5/2002 | Powrozek | .................... | 188/156 |
| 6,522,967 B1 * | 2/2003 | Pfeil et al. | ...................... | 701/70 |
| 6,609,595 B2 * | 8/2003 | Flynn et al. | ................. | 188/156 |
| 6,782,978 B2 * | 8/2004 | Tachiiri et al. | ............. | 188/157 |
| 2002/0066626 A1 * | 6/2002 | Gill et al. | .................... | 188/158 |
| 2003/0066714 A1 * | 4/2003 | Flynn et al. | ................. | 188/2 D |
| 2004/0011605 A1 * | 1/2004 | Tachiiri et al. | ............. | 188/156 |
| 2005/0000762 A1 * | 1/2005 | Powrozek et al. | .......... | 188/162 |

FOREIGN PATENT DOCUMENTS

| EP | 001462330 A2 | * | 9/2004 |
|---|---|---|---|
| JP | 5-286424 | * | 11/1993 |
| WO | WO98/56633 | * | 12/1998 |

* cited by examiner

*Primary Examiner*—Devon C. Kramer
(74) *Attorney, Agent, or Firm*—Jack Benefiel Law Offices; Dean B. Watson (57) ABSTRACT

An electrically powered actuator mechanism for operating a vehicle parking brake including a reversible electrical motor having output gearing driving a sector gear. A wrapped spring clutch drivingly connects the sector gear to an intermediate operator cable wind up wheel. The intermediate cable is connected to the brake cable to set the brakes when the operator cable is wound up by energization of the motor in one direction, with a load sensor turning off the motor when a predetermined tension load is reached. Locking motor gearing holds the brake in the set condition. Reversal of the motor unwinds the cable to release the parking brake. A self adjusting feature is provided by a pretensioned clock spring creating a torsional bias on the wind up wheel tending to maintain a predetermined tension in the brake cable. A spring clutch is released by engagement of a release arm to allow the clock spring to adjust the wind up wheel. A cable operated manual release causes a release lever to engage the clutch spring release arm to allow the cable to release although the clock spring maintains a minimum tension after release of the wind up wheel.

19 Claims, 10 Drawing Sheets

SELF ADJUSTING ELECTRICALLY POWERED PARKING BRAKE ACTUATOR MECHANISM WITH MANUAL RELEASE

CROSS REFERENCE TO RELATED APPLICATION

This application claims the benefit of U.S. provisional Ser. No. 60/457,776, filed Mar. 26, 2003.

BACKGROUND OF THE INVENTION

This invention concerns electrically powered actuator mechanisms for automobile parking brakes in which an electrical motor is selectively activated to set or release the vehicle brakes by a control switch. Such powered parking brakes add a measure of convenience over the usual manually operated parking brakes.

However, it would be highly desirable that a manual release be incorporated as well as a powered release to allow vehicle operation in the event of failure of the powered system.

Another desirable feature would be a self adjusting mechanism which would automatically take up the brake operating cable slack, which typically will increase over time, to avoid the delay in actuating the brake which would otherwise occur. Such self adjust features have heretofore been incorporated in manually operated parking brakes but have not been incorporated in electrically actuated parking brakes.

Such self adjustment action should desirably eliminate the need for adjustment when the parking brake actuator is installed during vehicle assembly to reduce the labor involved in carrying out the installation.

Such a parking brake should itself be compact and reliable while providing these features.

The object of the present invention is to provide an electrically operated actuator mechanism for vehicle parking brakes which can electrically apply and release the brakes but which also allows a manual release of the brakes.

It is another object of the present invention to provide an electrically powered actuator mechanism for parking brakes which incorporates a self adjustment of the brake operator cable to automatically take up any slack which develops to avoid any delay in applying the parking brake.

SUMMARY OF THE INVENTION

These and other objects of the present invention which will be understood upon a reading of the following specification and claims are achieved by a parking brake actuator mechanism in which a reversible electrical motor is selectively energized in a first direction to apply the brakes, and in a second direction to release the brakes.

A manual release cable is connected to the parking brake actuation mechanism to release the brakes when the cable is pulled as by a release lever or button in the passenger compartment.

A prewound clock spring is connected to apply a predetermined tension to the brake operator cable whenever the brake is released, to take up any slack developing in the system prior to the next engagement of the brake.

A prewound clutch spring establishes a driving connection between a pivot member comprised of a sector gear driven by an electric motor output gearing and a rotary cable track wind up wheel which is freely rotatable on a drive shaft connected to the sector gear to be rotated therewith. The cable wind up wheel has an intermediate operator cable partially wrapped therein in a guide groove in the wind up wheel perimeter which also has a drum clutch surface over which one section of a the clutch spring is received. An auxiliary drum is drivingly engaged with the drive pin to be rotated therewith and receives the other section of the clutch spring.

When the sector gear is driven by the motor in a direction applying the brakes, the clutch spring, wrapped tightly onto both drum surfaces, causes the operator cable to be wound up on the cable operator track up wheel. This pulls the brake cable connected to the brake via a cable connector and load sensor. When the sensor detects development of a preset cable load, the motor control circuit turns off the motor. The motor output includes irreversible gearing which holds the cable in the brake set position.

The distribution of the clutch spring engagement stress across both the auxiliary drum and the cable wind up wheel drum surface reduces the concentration of stress over prior uses of a clutch spring in manually actuated brakes which concentrated the stress at the first winding of the clutch spring leading to increased wear.

To power release the parking brake, the motor is driven in a reverse direction to drive the sector gear so as to cause unwinding of the operator cable from the groove on the cable wind up wheel. The clutch spring at this time continues to maintain a driving connection to the cable track wind up wheel until a release leg of the clutch spring is driven sufficiently far to engage a fixed post, causing the clutch spring to be expanded to disengage from both clutch drum surfaces, releasing the rotary connection between the cable wind up wheel and the sector gear. This allows the torsion developed by the clock spring to act on the released cable wind up wheel to exert a pull on the brake operator cable and establish a predetermined pretensioning therein which is not sufficient to operate the brake but sufficient to eliminate any slack. The motor is then stopped by the control circuit when a rotary position sensor detects sufficient sector gear travel to insure that release of the clutch spring has occurred.

To effect a manual release, a manual release cable wire is pulled by manipulation of a lever or button in the passenger compartment, which causes rotation of a manual release lever pivoted on one end of the drive pin. In one embodiment, a separate release cam also pivoted on the drive pin, engages a first tab on the manual release lever and rotates the release lever to cause a second tab to be engaged with the release leg of the clutch spring to again release the cable track wind up wheel. In a second embodiment, the manual release cable wire is directly attached to the manual release lever.

A release lever positioner spring holds that lever in proper position. A release cam positioner spring on the manual release cable holds the release cam in position retracted away from the tab on the release lever when the release cam is used.

The pretensioning system includes the clock spring which is received within a cavity within the cable wind up wheel, which has one end connected to the inside of the cable track wind up wheel cavity and anchored at its other end to the drive pin. The clock spring is prewound at assembly when the sector gear is driven by the drive motor to release the clutch spring and allowing free rotation of the cable wind up wheel, the brake operator cable is pulled to prewind the clock spring to create a stored torsional energy. The operator cable connector is then held fixedly in that position by insertion of a tension lock pin or clip.

After the mechanism is assembled into an automobile, the lock pin or clip is removed. The prewound clock spring then acts to rotate the cable track wind up wheel to take up any slack in the brake cable.

As soon as the spring clutch is again engaged with the wind up wheel at its new position, there is no lost motion from cable slack to delay brake engagement.

Thus every time the cable track wind up wheel is released, the clock spring automatically acts to reestablish proper cable tension and repositions the wind up wheel if any slack develops prior to the next brake application.

An alternate sensor installation may provide an indirect measurement of the force in the brake apply cable by mounting a load sensor to measure the reaction force at the drive pin generated by the cable tension. This reaction force is used to determine the cable load being generated by the motor.

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Figure 1:
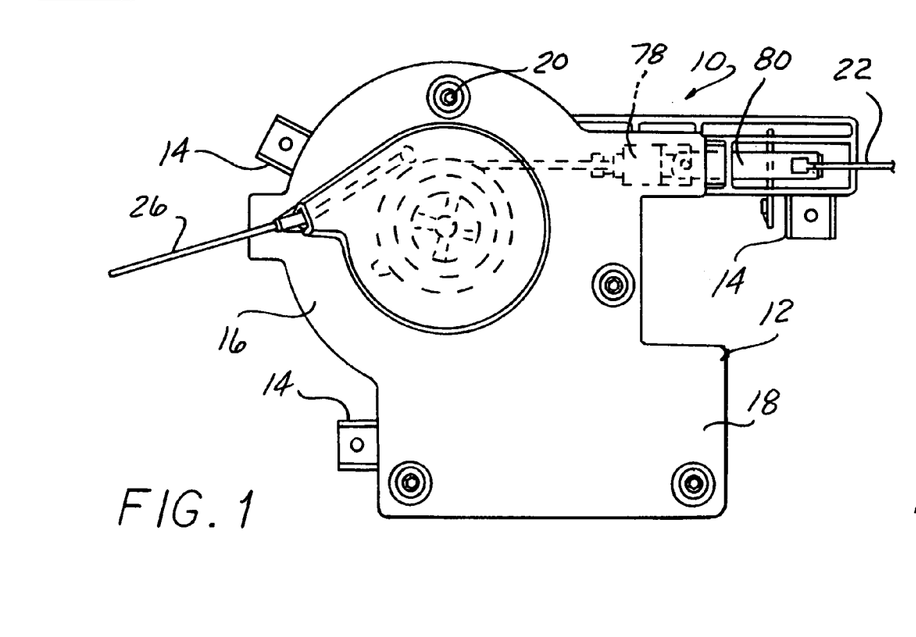
FIG. 1 is a side view of a parking brake actuator mechanism according to the present invention.
Figure 2:
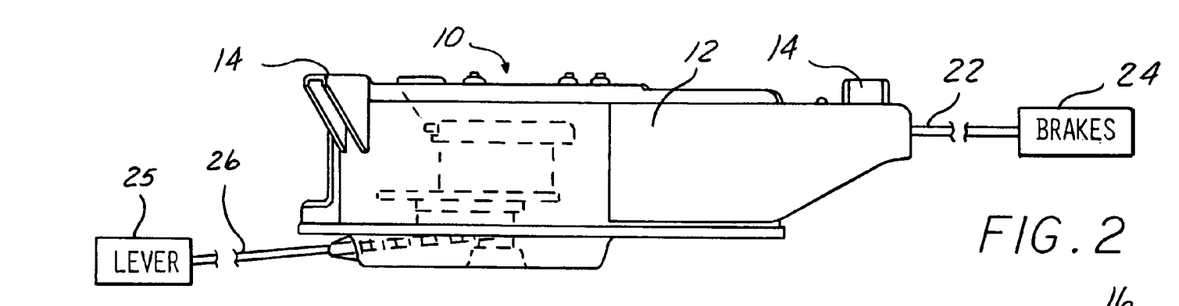
FIG. 2 is a top view of the actuator mechanism shown in FIG. 1.
Figure 3:
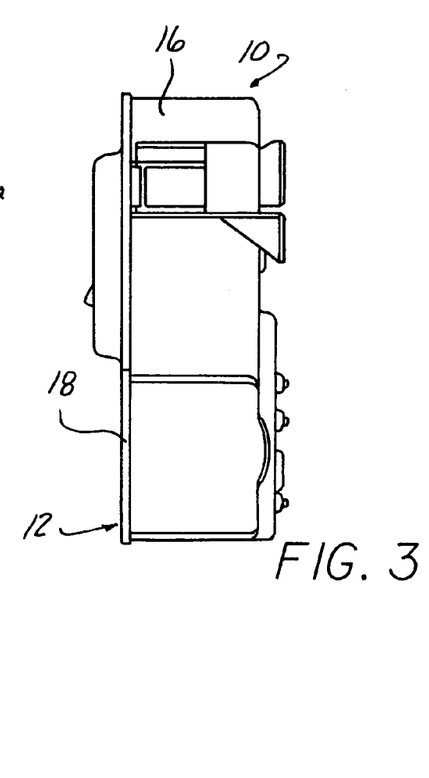
FIG. 3 is an end view of the actuator mechanism shown in FIGS. 1 and 2.

Referring to FIGS. 1–3, the electrically powered parking brake actuator mechanism 10 includes a housing 12 adapted to be mounted to a structure within an automotive vehicle by mounting ears 14. The housing 12 is of a two piece construction including an enclosure 16 and a cover 18 with gasket 19 held together with socket head screws 20.

A brake operating cable 22 passes out of the housing 12 and extends to vehicle rear brakes 24, used as parking brakes when operated by the actuator mechanism 10 according to the present invention.

A manual brake release cable 26 also extends out of the housing 12 and extends to a suitable operating lever or button 25 located in the passenger compartment of the vehicle.

Figure 4:
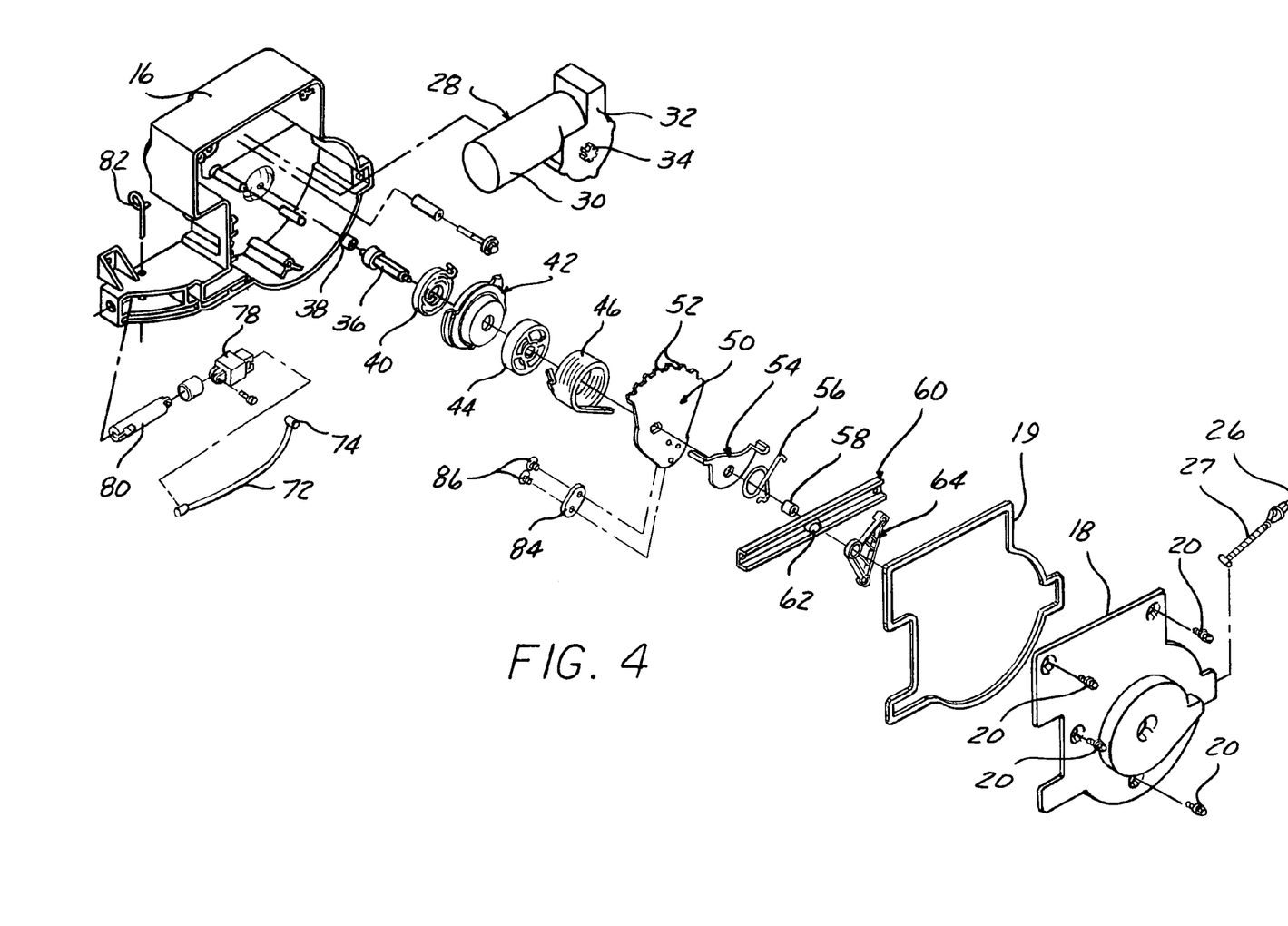
FIG. 4 is an exploded pictorial view of a parking brake actuator mechanism according to the present invention.
Figure 4A:
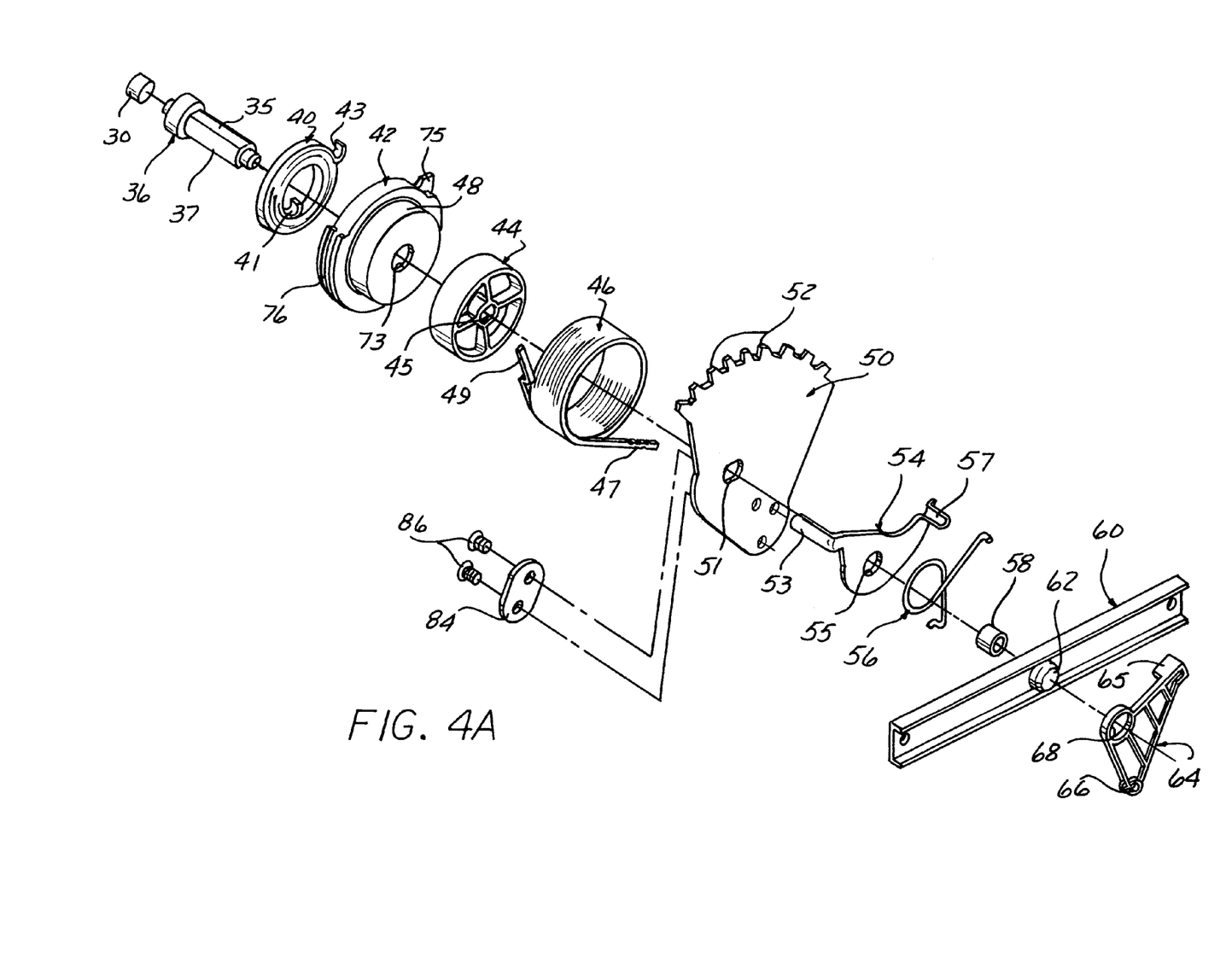

FIGS. 4 and 4a show the components of the actuator mechanism 10 which includes an electric motor-gearing unit 28 which includes an electric motor 30 and a rotary output comprising a right angle gear unit 32 including an output pinion gear 34 rotated by self locking worm gearing (not shown) which locks the pinion gear 34 whenever the motor 30 is not energized. The motor-gearing unit 28 is mounted within the main housing 16.

A drive shaft 36 is rotatably mounted in a bearing 38 at one end thereof and extends through a clock spring 40, an intermediate operator cable wind up wheel 42, and an auxiliary drum 44. A clutch spring 46 is received over a drum surface 48 on one end of the wind up wheel 42 and completely over the auxiliary drum 44. Normally the clutch spring 46 tightly grips both the auxiliary drum 44 and the drum surface 48.

The drive shaft 36 also passes through a pivot member, here comprised of a sector gear 50 having gear teeth 52 formed therein in mesh with the pinion gear 34, a manual release lever 54, and a locator spring 56. The end of the drive shaft 36 is rotatably mounted in a bearing 58 in a bearing seat 62 formed in a cross brace 60 mounted in the housing 12.

A manual release cam 64 has a bore 68 at one corner rotatable on the bearing seat 62 on the opposite side of the cross brace 60, and has a manual release cable 26 attached to one corner 66 thereof.

The drive shaft 36 has a segment 37 formed round but with flats 35 formed on either side to create a driving relationship with complementary flat sided bore 45 in the auxiliary drum 44 and flat sided bore 51 in the sector gear 50. The wind up wheel 42 has a round bore 73 allowing free rotation on the drive shaft segment 37. Manual release lever 54 is also rotatable thereon by receiving the drive shaft segment 37 in a round hole 55.

The clock spring 40 is received within a circular cavity 70 inside the cable wind up wheel 42, having an inner formed over end 41 secured to the drive shaft 36 and on outer formed over end 43 secured to the inside of the cavity 70

Figure 8:
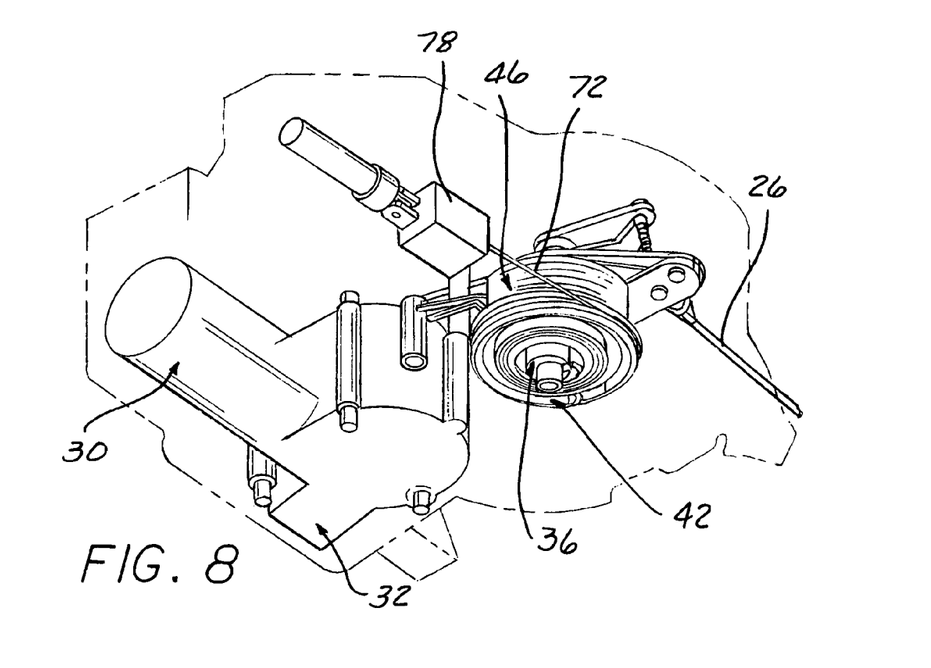
FIG. 8 is a pictorial view of the interior actuator mechanism components viewed from below to show the self adjust function components.
Figure 9:
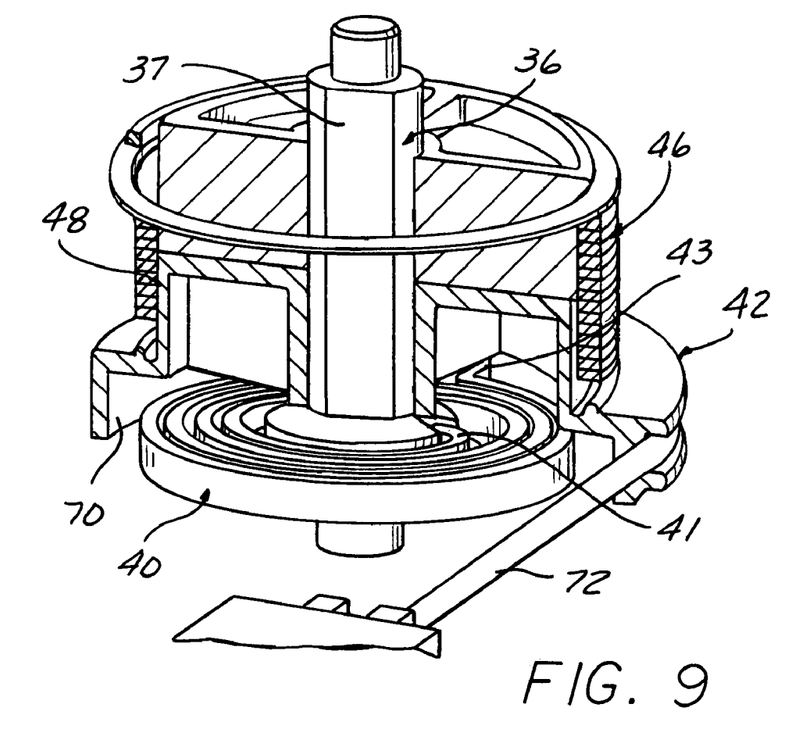
FIG. 9 is a pictorial view of actuator mechanism interior components with a cable wind up wheel, auxiliary drum and clutch spring partially broken away to show the clutch spring engagement therewith.

(FIGS. 8, 9). Thus, when the spring 40 is prewound, the cable wind up wheel 42 is urged to rotate so as to partially wind up an intermediate operator cable 72 having one end held in an anchor 75 by a cross pin 74 and received in a groove track 76.

The other end of the intermediate operator cable 72 is connected to a load sensor 78 and cable coupling 80 to which the brake operating cable 22 is attached.

The intermediate operator cable 72 is pulled to prewind the clock spring 40 to be tensioned to a predetermined level prior to installation of the actuator mechanism 10, and a temporary locking pin 82 thereafter installed in holes in the housing enclosure 16 (FIG. 4) to maintain the torsional tension in the now wound clock spring 40.

Upon installation of the actuator mechanism 10, the locking pin 82 is removed. The clock spring torsional tension then acts on the cable wind up wheel 42 to pull on the cable 72 and provide the self adjusting feature as described below, since a predetermined cable tension in the brake operating cable 22 is thereby created.

The clutch spring 46 has a tangential drive leg 47 fixed to the sector gear 50 by a clamping plate 84 attached thereto with screws 86. A release leg 49 is used to expand and controllably disengage the clutch spring 46 from the drum surface 48 as will be described below.

The manual release lever 54 has an elongated finger 53 which extends to be engagable with the release leg 49 when a tab 65 of the manual release cam 64 engages a tab 57 on the manual release lever upon retraction of the manual release cable 26 as described below.

Positioner spring 56 holds the lever 54 away from engagement with the release leg 49 until the manual release cable 26 is retracted. A spring 27 on the cable 26 urges the manual release cam 44 to a disengaged position until the movable core wire in the manual release cable 26 is retracted.

Figure 5:
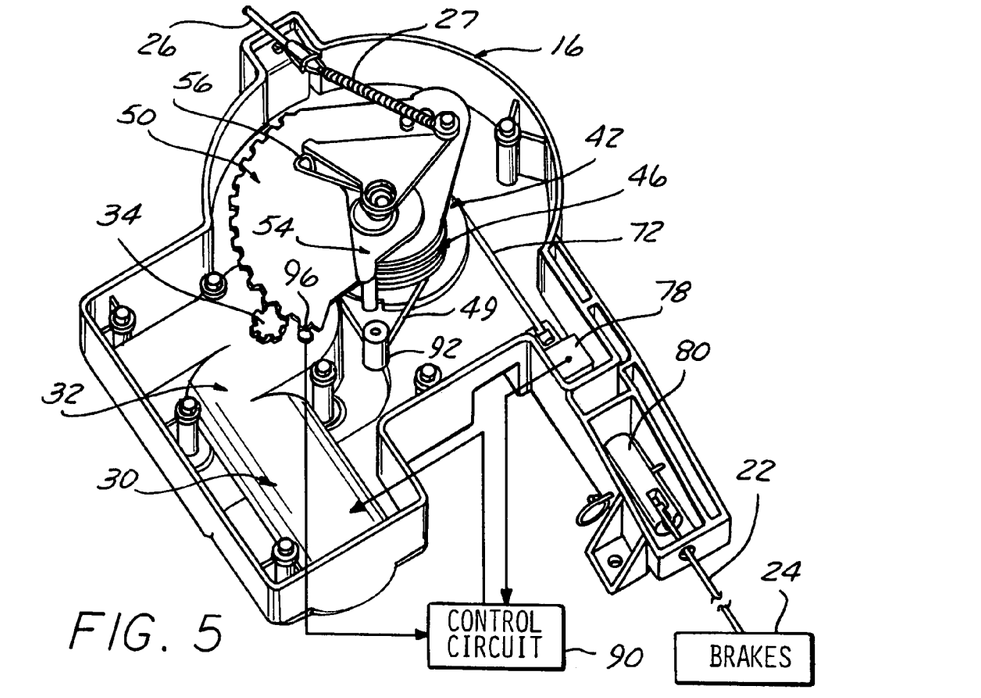
FIG. 5 is a pictorial view of the actuator mechanism with the housing cover removed to show the interior components of the actuator mechanism at the start of the powered brake apply condition.

FIG. 5 shows the sector gear 50 at the beginning of a powered parking brake application. A control circuit 90 includes a dash mounted switch (not shown) which may be selectively operated to energize the electric motor 30, causing the sector gear 50 to be pivoted by rotation of the pinion gear 34 so as to swing the sector gear 50 counter clockwise as viewed in FIG. 5.

Since the clutch spring 46 grips the drum surface 48 on the cable wind up wheel 42, the rotation of the attached sector gear 50 rotates the wind up wheel 42 to further wrap up the intermediate operator cable 72 thereon.

This pulls on the brake cable 22 via the connection provided via the load sensor 78 and coupling 80 to apply the brakes 24.

The motor 30 continues to operate until a predetermined load is detected by the load sensor 78, the control circuit 90 then automatically deactivating the motor 30. The brakes 24 remain applied due to the action of the internal self locking gearing included in the motor drive unit 30.

Figure 6:
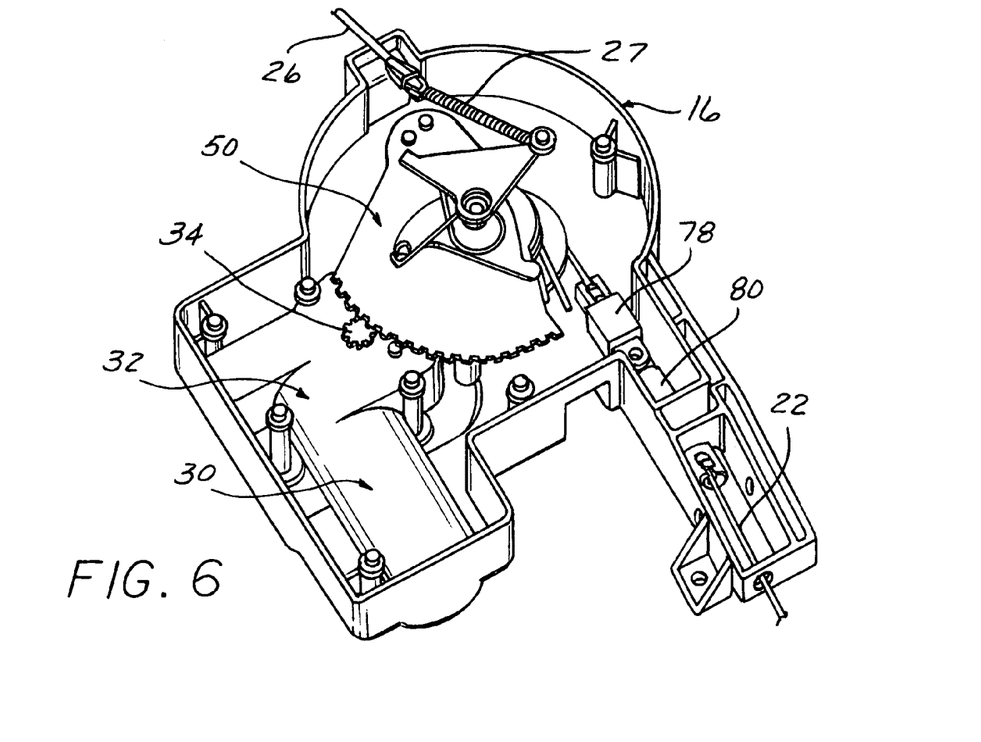
FIG. 6 is a pictorial view of the actuator mechanism components shown in FIG. 5 at the start of the powered brake release operation.

FIG. 6 depicts the brake applied position of the sector gear 50.

During this operation, the clutch spring 46 grips both the drum surface 48 and the auxiliary drum 44 so that wear is not concentrated at the first turn on the drum surface 48 but rather over a wider area.

To release the brakes 24, the switch included in control circuit 90 is operated to energize the motor in the reverse direction. The clutch spring 46 continues to grip the drum surface 48 since it is designed to normally grip the drum surfaces 48, and since the wind up wheel 42 is continually urged to rotate counter clockwise as viewed in FIGS. 5 and 6 by the clock spring 40, so that rotation of the sector gear 50 clockwise causes clockwise rotation of the wind up wheel 42, releasing tension in the brake cable 22 and thus releasing the brakes 24.

The motor 30 continues to operate, carrying the release leg 49 of the clutch spring 46 into engagement with a fixed post 92 as shown in FIG. 5.

Continued rotation to advance the release leg 49 causes the clutch spring 46 to expand, releasing its engagement with the drum surface 48.

The motor 30 continues to rotate until a position sensor 96 adjacent the sector gear 50 perimeter signals the control circuit 90 that the sector gear 50 has reached a position insuring full release of the clutch spring 46, the control circuit 90 then causing the motor 30 to be deactivated.

Figure 7:
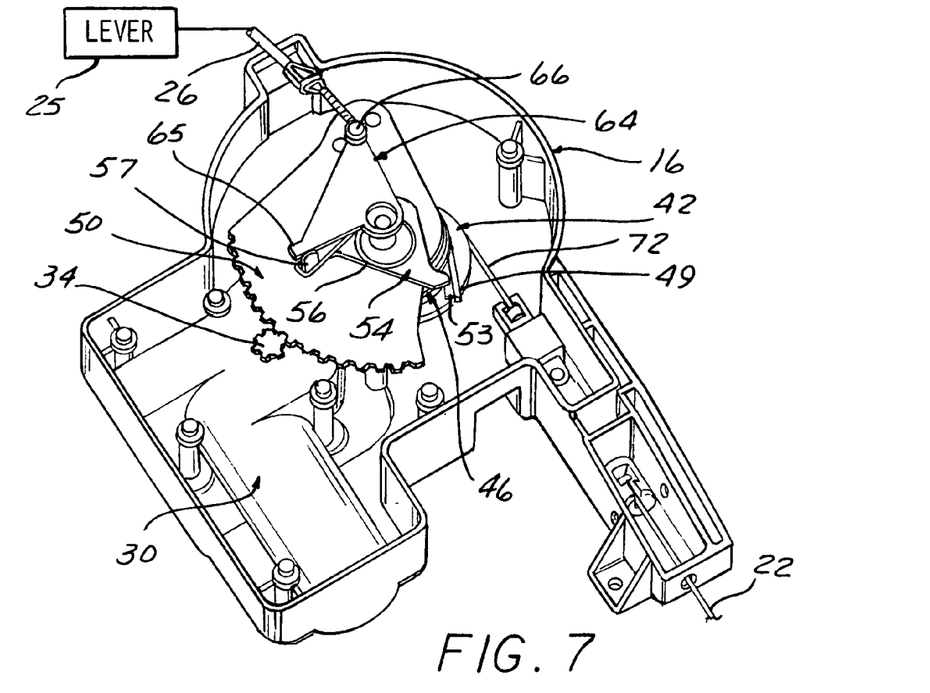
FIG. 7 is a pictorial view of the actuator mechanism components shown in FIGS. 5 and 6 with the manual release of the brakes completed.

FIG. 7 shows a manual release using the manual release cable 26, which has a core wire pulled by manipulation of a lever or button 25 accessible from the passenger compartment. The release cam 64 is thereby rotated counter clockwise as seen in FIG. 7 about its axis of rotation defined by the center of bore 68 (bracket 60 and bearing seat 62 not shown for clarity). The tab 65 engages the tab 57 of the release lever 54, causing rotation thereof in the same direction. This causes the finger 53 to engage the release leg 49 of the clutch spring 42 and expand the clutch spring 42 releasing its engagement with the drum surface 48 of the wind up wheel 42. This releases the intermediate operator cable 72 to thereby relax brake cable 22 and allow disengagement of the parking brakes 24.

The clock spring 40 however continues to act on the wind up wheel 42 so as to maintain a minimum tension on the intermediate cable 72 to eliminate any slack that has developed.

Upon the next engagement of the clutch spring 46, if any rotation of the wind up wheel 42 has occurred to eliminate slack, the clutch spring 46 will engage the drum surface 48 in the rotated position so that only the same travel is necessary to set the brakes, avoiding any cumulative slow down of the actuation time necessary.

Figure 10:
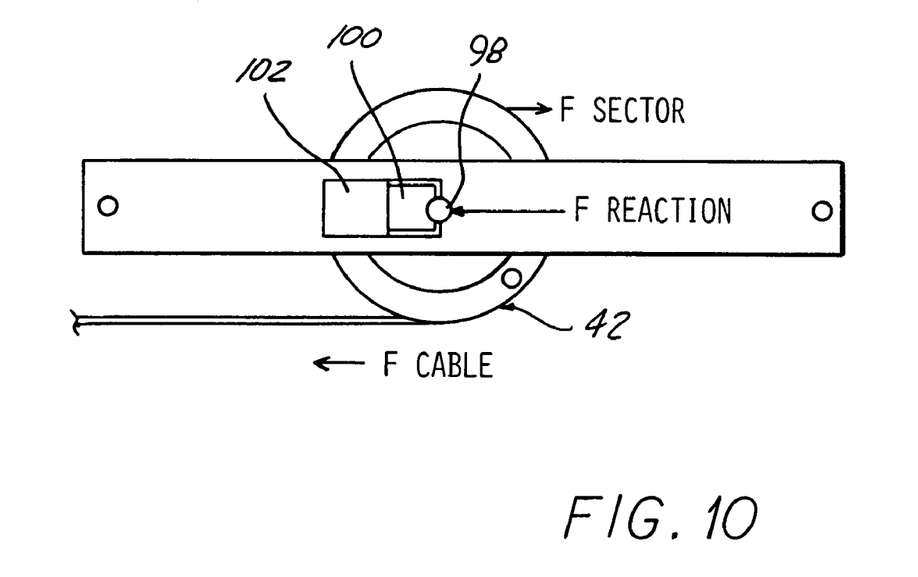
FIG. 10 is a diagram depicting an alternate form of load sensor arrangement incorporated in the actuator mechanism according to the invention, depicting the force loading.
Figure 11:
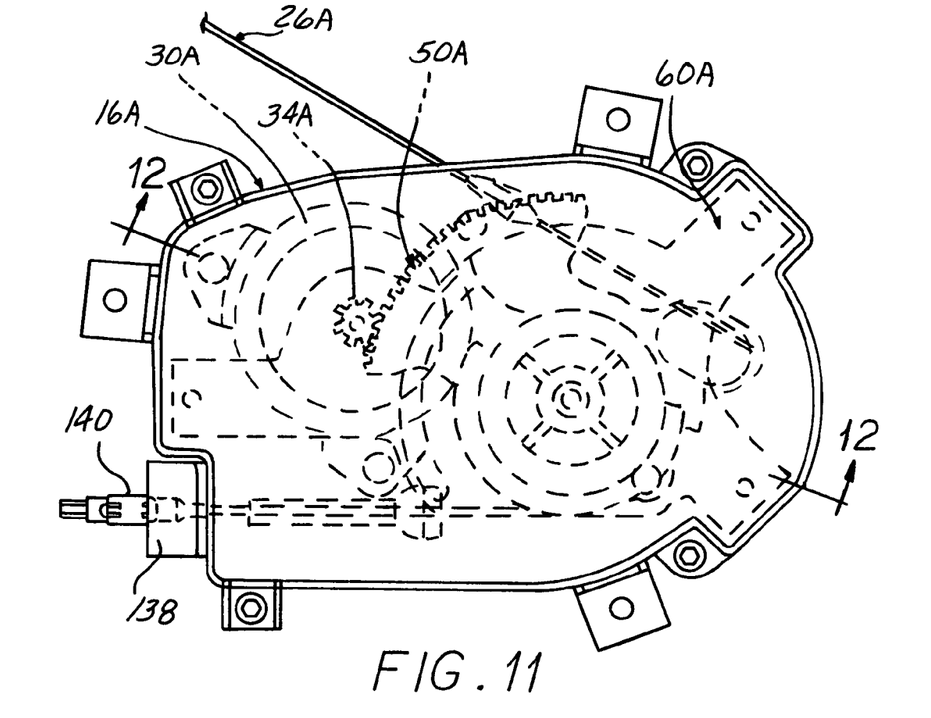
FIG. 11 is a side view of an alternate embodiment of the actuator mechanism according to the invention.

FIG. 10 depicts an alternate form of load sensor, in which a pivot 98 on the end of the drive shaft 36 is held by a slide 100 mounted on the bracket 60A. A load sensor 102 senses the reaction load on the pivot 98. The pivot 98 is subjected to part of the reaction force generated by the tension in the cable 22, and hence the load sensor 102 can be used to detect the level of force causing the motor 30 to be deactivated, since it corresponds to the force applied to the brakes 24.

The components can be arranged differently, as for example in a second embodiment of an actuation mechanism 10A shown in FIGS. 11–17. In this embodiment, the electric drive motor 30A has its axis oriented parallel to the axis of the cable wind up wheel 42A and pivot member comprised of sector gear 50A.

Figure 13:
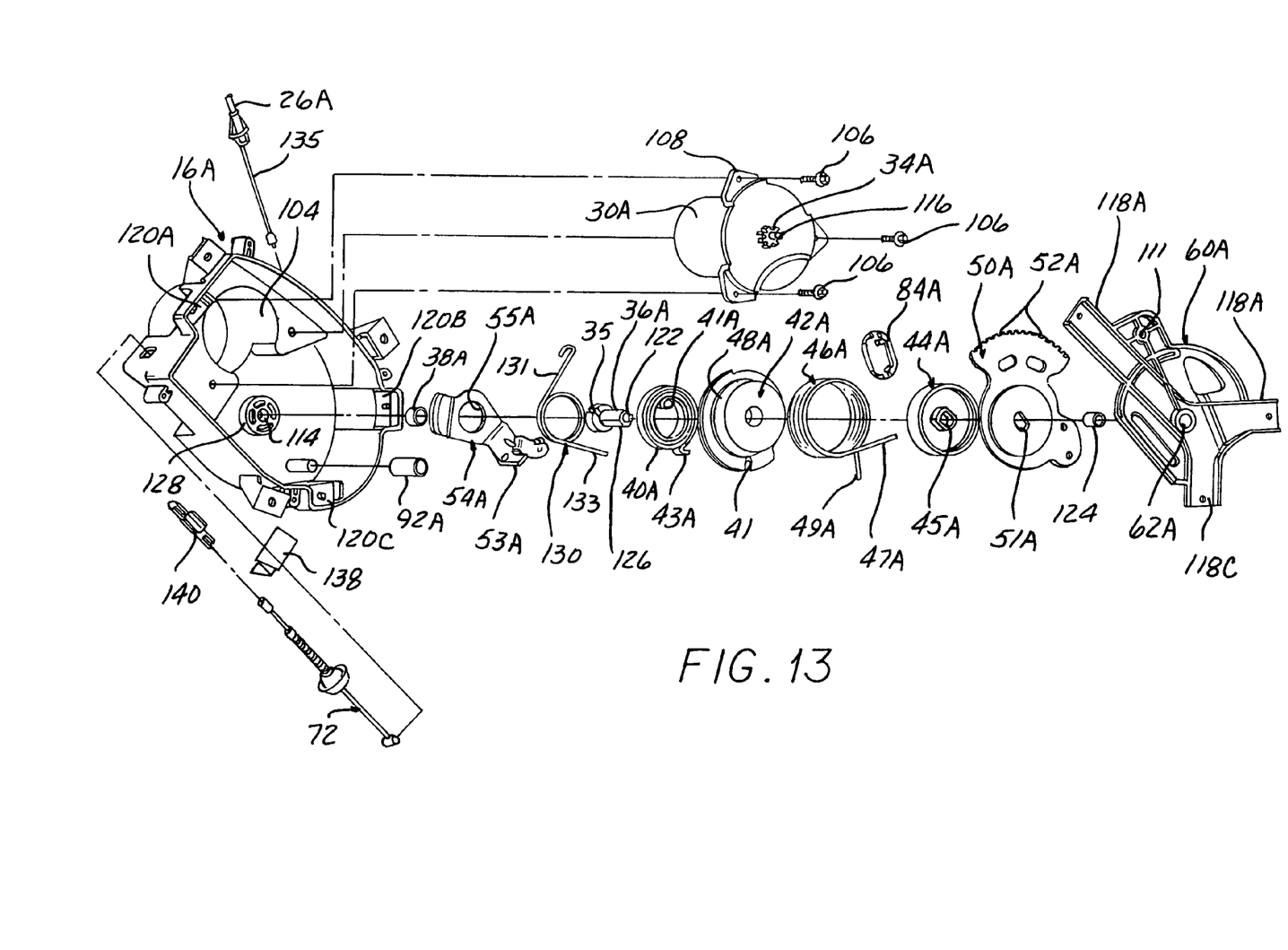
FIG. 13 is an exploded pictorial view of the components of the actuator mechanism shown in FIGS. 11 and 12.
Figure 14:
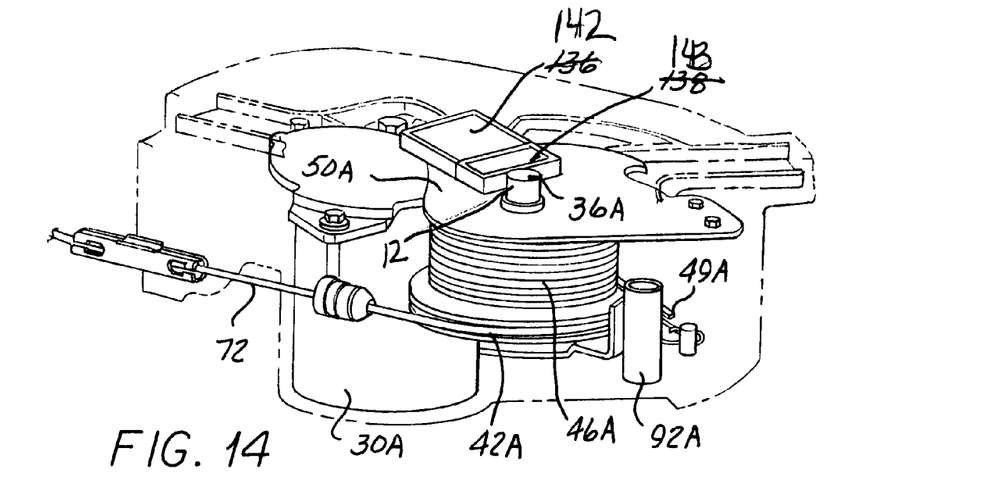
FIG. 14 is a pictorial view from the top of the actuator mechanism shown in FIGS. 11 and 12 at the beginning of the brake apply cycle.

The motor 30A is received in a recess 104 in the housing enclosure 16A secured with screws 106 passing through tabs 108 and received in sockets 110 and has an output gear unit including a pinion gear 34A meshed with gear teeth 52A on the sector gear 50A.

A drive shaft 36A has a pin 112 on one end received in a bearing sleeve 38A in turn held in socket 114 molded in the rear wall of the housing enclosure 16A.

The pinion gear 34A also has a plug end 116 received in a mating hole 111 in a cross brace 60A having three ends 118A, B, C, received in corresponding recesses 120A, B, C and molded into the housing 16A and secured with screws (not shown).

The drive shaft 36A has a reduced diameter end 122 received in a bearing 124 received in a bearing socket 62A formed in the brace 60A.

The drive shaft 36A has flats 126 on a rounded portion 37A mating with elongated opening 51A in the sector gear 50A and opening 45A in the auxiliary drum 44A so as to rotate together.

The drive shaft 36A provides rotary support for the cable wind up wheel 42A. The manual operating lever 54A is rotatably mounted on an outside diameter 128 of the socket 114 received in a large diameter hole 55A therein.

Figure 16:
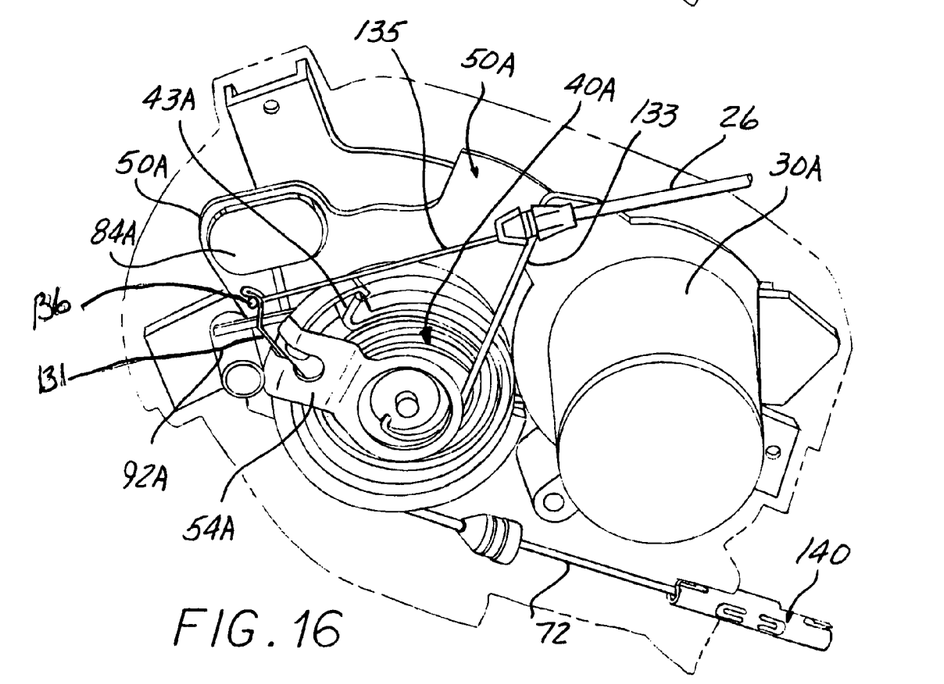
FIG. 16 is a pictorial view from the bottom of the actuator mechanism shown in FIGS. 11 and 12 prior to operation of the manual release.
Figure 17:
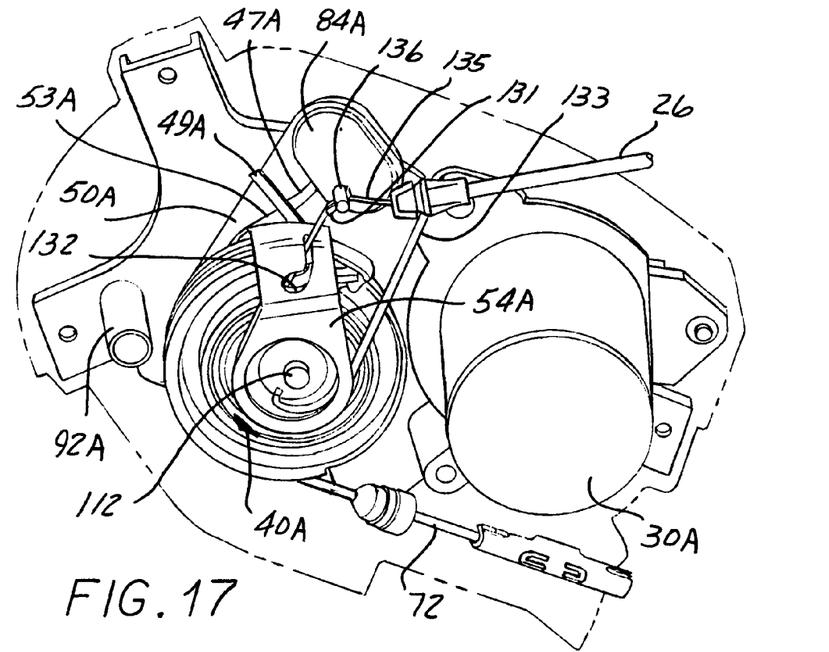
FIG. 17 is a pictorial view from the bottom of the actuator mechanism shown in FIGS. 11 and 12 after operation of the manual release.

In this second embodiment, the manual release lever 54A is itself directly connected to the manual release cable 26 by a cross pin 136 on the core wire 135 interfit in a looped end of an arm 131 of a wound wire spring 130, the wire spring 130 having the formed arm 131 received in notch 132 in the manual release lever 54A, with the opposite arm 133 anchored against the housing enclosure 16A, as best seen in FIGS. 16 and 17.

The clock spring 40A has its inner formed over end 41 A received in a slot 35 in the drive shaft 36A and its outer formed over end 43A held in a cylindrical cavity 41 in the cable wind up wheel 42A.

The clutch spring 46 is received over a drum surface 48A of the cable wind up wheel 42A and also the auxiliary drum 44A, as in the first described embodiment.

A spring clip 138 is used to hold the operator cable 72 with the clock spring 40A in the prewound condition until the actuator 10A is installed in the vehicle, one edge engaging connector 140.

A load sensor 142 is engaged by a slider 143 abutting the plug end 122 of the drive shaft 36A (FIG. 14) to provide a control signal corresponding to the cable load on the brake cable 22.

The actuator 10A generally operates in the same manner as the first described embodiment.

The motor 30A when energized drives the sector gear 50A, which in turn rotates the cable wind up wheel 42A by the driving connection created by the spring clutch 46A. This continues until the load sensor 142 senses a tension load sufficient to set the brakes (FIG. 14) and the control circuit (not shown) turns off the motor 30A. The brakes 24 are held in the applied condition by the self locking motor gearing.

Figure 15:
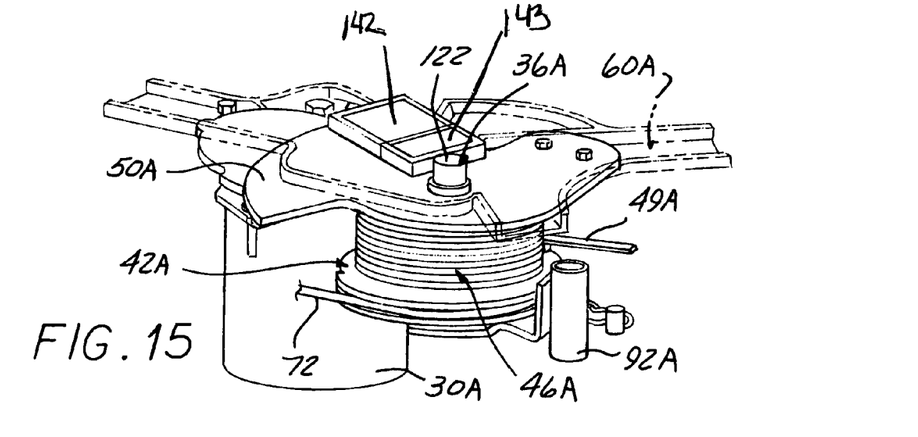
FIG. 15 is a pictorial view from the top of the actuator mechanism shown in FIGS. 11 and 12 at the beginning of the powered release cycle.

To power release, the motor 30A is activated to drive in the opposite direction to rotate the sector gear 50A in the opposite direction unwinding the cable 72 until the leg 49A engages post 92A to expand and release the clutch spring 46A (FIG. 15). The motor 30A is turned off when a sector gear position sensor (not shown) senses that sufficient travel has occurred to insure release of the clutch spring 46A and then de-energize the motor 30A as in the first described embodiment.

Referring to FIGS. 16 and 17, the manual release lever 54A is rotated when the core wire 135 of the manual release cable 26 is drawn back, causing a tab 53A to engage release arm 49A of the clutch spring 46A and disengage the clutch spring 46A.

Figure 12:
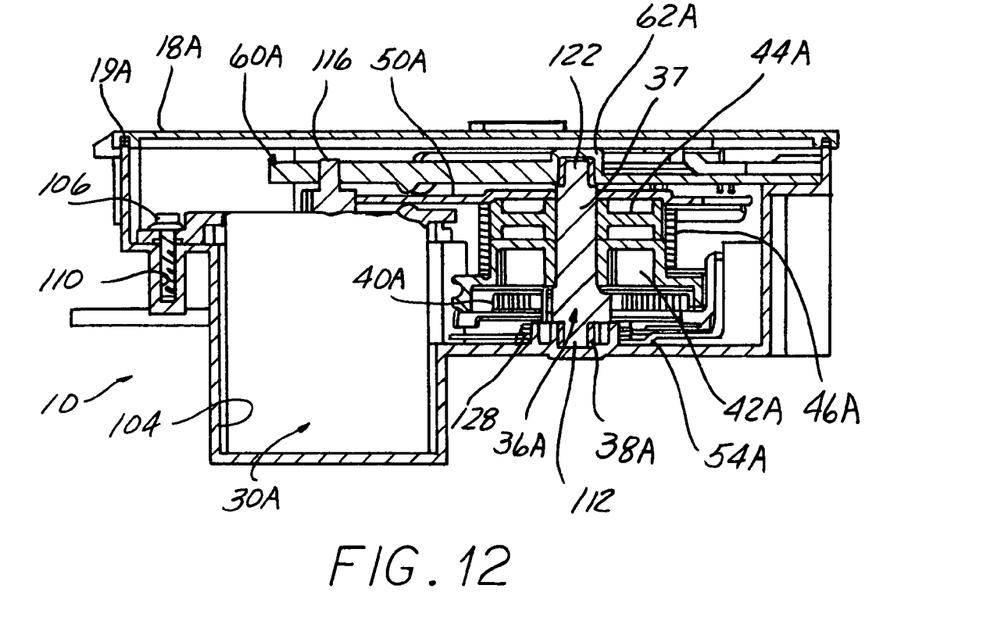
FIG. 12 is a view of the section 12—12 taken in FIG. 11.
Figure 18:
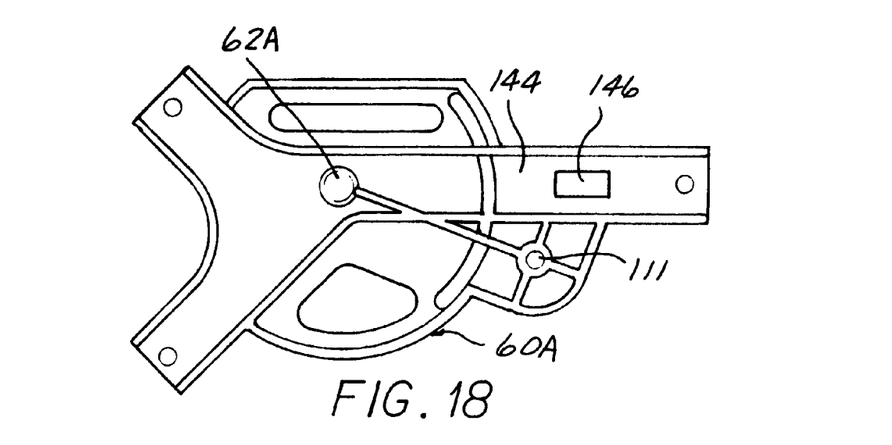
FIG. 18 is a plan view of the cross brace showing one form of the load sensor used to control operation of the motor.

FIG. 18 shows the bracket 60A which is formed with the seat 62A receiving a bearing 124 supporting the reduced diameter end 122 of the drive shaft 36A (FIG. 12). An alternate form of load sensor takes advantage of the fact that the leg 144 of the bracket 60A is placed in compression by the reaction of drive shaft 36A to the load of the brake cable 22. A strain gauge 146 is used to measure the level of that compression to provide the load signal for turning off the motor 30A at the proper time during the brake apply cycle.

What is claimed is:

1. A parking brake actuator mechanism for setting and releasing an automotive parking brake comprising:
   a reversible drive motor having a rotary output gearing;
   a pivot member driven by said drive motor output gearing and mounted to be pivoted about a rotary support in an actuator housing in either direction;
   a cable wind up wheel rotatably supported in said housing and having a cable adapted to be connected to an automotive parking brake wrapped onto a perimeter of said wind up wheel to be wound up thereon upon rotation in one direction to set an automotive parking brake and unwound therefrom upon rotation in an opposite direction to release an automotive parking brake;
   a clutch establishing a driving connection between said pivot member and said wind up wheel upon rotation of said motor output gearing in both a brake apply and release direction;
   said clutch including a disengagement feature and said actuator mechanism including a disengagement feature located to engage said clutch disengagement feature and cause consequent disengagement of said clutch upon continued rotation of said pivot member in a release direction past a predetermined point whereat release of a connected parking brake would occur thereby disconnecting said driving connection between said wind up wheel and said pivot member.

2. An actuator mechanism according to claim 1 wherein said clutch comprises a wrapped spring clutch having an arm connected to said pivot member and windings wrapped over a drum surface on said wind up wheel, said spring clutch establishing a rotary driving connection between said pivot member and said wind up wheel by gripping of said drum surface.

3. An actuator mechanism according to claim 1 further including a pretensioned torsion developing spring connected at one end to said wind up wheel to urge said rotation thereof in a direction to create tensioning of said cable, said torsion developing spring anchored at another end relative said pivot member, whereby upon release of said clutch, said prewound torsion developing spring tensions said cable by urging wind up of said wind up wheel.

4. An actuator mechanism according to claim 1 wherein said motor driven output gearing is self locking to hold said cable in tension upon deactivating said motor.

5. An actuator mechanism according to claim 4 further including a load sensor producing signals corresponding to said cable tension, and a control circuit connected to said load sensor deactivating said motor in response to receipt of a signal produced by a cable tension level corresponding to a brake set condition.

6. An actuator mechanism according to claim 1 further including a position sensor sensing the extent of releasing rotation of said pivot member and a motor control circuit connected to said sensor causing said motor to be deactivated after sufficient releasing rotation to insure engagement of said disengagement feature with a fixed feature upon continued rotation of said wind up wheel to disconnect said driving connection of said pivot member to said wind up wheel by disengagement of said clutch.

7. An actuator mechanism according to claim 6 further including a prewound torsion developing clock spring connected at one end to said wind up wheel to urge said rotation thereof in a direction to create tensioning of said cable, said torsion developing clock spring anchored at another end relative said pivot member, whereby upon release of said clutch, said prewound torsion developing clock spring tensions said cable by urging wind up of said winding wheel.

8. An actuator mechanism according to claim 2 further including an auxiliary drum connected to said pivot member and located adjacent to said wind up wheel drum surface and having a drum surface matched thereto said wind up wheel drum surface so that said spring clutch grip both of said drum surfaces to reduce wear on said wind up wheel drum surface.

9. An actuator mechanism according to claim 1 further including a manual release element selectively movable to disengage said clutch by engagement with said clutch disengagement feature.

10. An actuator mechanism according to claim 9 further including a torsion developing clock spring connected at one end to said wind up wheel to urge said rotation thereof in a direction to create tensioning of said cable, said clock spring anchored at another end relative said pivot member, whereby upon release of said clutch, said torsion developing clock spring tensions said cable by urging wind up of said winding wheel.

11. An actuator mechanism according to claim 2 wherein said wind up wheel is rotatable upon a drive shaft extending to said pivot member and drivingly mated to a hole in said pivot member to establish a rotary connection therewith.

12. An actuator mechanism according to claim 11 further including an auxiliary drum having a hole through which said drive shaft extends with a mating interfit therebetween creating a driving connection, said auxiliary drum having a drum surface matching said wind up wheel drum surface and adjacent thereto, a spring clutch received over both of said drum surfaces.

13. An actuator mechanism according to claim 5 wherein said load sensor is connected to said cable to measure the tension therein.

14. An actuator mechanism according to claim 5 wherein said load sensor is associated with a rotary support for said wind up wheel and measures a reaction force caused by said cable tension.

15. An actuator mechanism according to claim 5 wherein said load sensor comprises a strain gauge mounted to a bracket supporting a rotary support for said pivot member.

16. An actuator mechanism according to claim 3 wherein said wind up wheel has a cylindrical cavity formed therein and wherein said pretensioned torsion developing spring comprises a clock spring disposed in said winding wheel cavity.

17. An actuator mechanism according to claim 16 wherein said clock spring has an outer winding connected to a cylindrical outer wall defining said cavity.

18. An actuator mechanism according to claim 16 further including a drive shaft extending through said wind up wheel which is freely rotatable thereon, said drive shaft extending to said pivot member and engaged therewith to establish a rotary connection, said clock spring having an inner winding connected to said drive shaft.

19. An actuator mechanism according to claim 1 wherein said pivot member comprises a sector gear and said motor rotary output includes a pinion gear engaged with said sector gear.

* * * * *